US009210725B2

(12) United States Patent
Kanamarlapudi et al.

(10) Patent No.: US 9,210,725 B2
(45) Date of Patent: Dec. 8, 2015

(54) METHOD AND APPARATUS FOR IMPROVING UPLINK PERFORMANCE AT A USER EQUIPMENT

(71) Applicant: QUALCOMM Incorporated, San Diego, CA (US)

(72) Inventors: Sitaramanjaneyulu Kanamarlapudi, San Diego, CA (US); Sivasubramanian Ramalingam, Hyderabad (IN); Liangchi Hsu, San Diego, CA (US); Hemanth Kumar Rayapati, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/286,506

(22) Filed: May 23, 2014

(65) Prior Publication Data

US 2015/0063313 A1    Mar. 5, 2015

Related U.S. Application Data

(60) Provisional application No. 61/872,326, filed on Aug. 30, 2013.

(51) Int. Cl.
*H04W 52/22* (2009.01)
*H04W 74/08* (2009.01)
(Continued)

(52) U.S. Cl.
CPC .......... *H04W 74/0833* (2013.01); *H04W 36/16* (2013.01); *H04W 36/30* (2013.01); *H04W 52/22* (2013.01); *H04W 52/367* (2013.01); *H04W 76/027* (2013.01)

(58) Field of Classification Search
CPC . H04W 74/0833; H04W 36/30; H04W 52/22; H04W 76/027; H04W 52/16; H04W 52/367; H04W 52/146; H04W 52/50; H04W 72/0433; H04W 72/042; H04W 40/02; H04W 52/14; H04W 52/242; H04W 74/0866; H04W 72/02; H04W 28/04; H04W 48/08; H04W 28/18; H04W 36/16; H04B 17/327; H04B 7/00; H04B 7/0877; H04J 11/0083
USPC ................. 370/332, 329, 328, 335, 311, 331; 455/522, 436, 226.1, 226.2, 226.3, 455/67.11, 69, 450, 517
See application file for complete search history.

(56) References Cited

U.S. PATENT DOCUMENTS 7,302,276 B2    11/2007  Bernhardsson et al.
7,330,698 B1 *   2/2008  Bolt et al. .................... 455/63.1
(Continued)

OTHER PUBLICATIONS

NTT Docomo, Inc., "RACH Transmission Failure Issue", Feb. 2013, 3GPP TSG-RAN WG2 Meeting #81, R2-130436, 3 Pages.*
(Continued)

*Primary Examiner* — Edan Orgad
*Assistant Examiner* — Ivan O Latorre
(74) *Attorney, Agent, or Firm* — Arent Fox LLP

(57) ABSTRACT

The present disclosure presents a method and apparatus for improving uplink (UL) performance at a user equipment (UE). For example, the method may include identifying a random access channel (RACH) preamble failure when the UE is communicating with a current serving cell of the UE, increasing transmission power of successive RACH preambles based at least on the identifying, comparing signals received on a downlink at the UE via a first path and a second path from the current serving cell of the UE, and determining that a RACH preamble failure problem exists at the UE based at least on the comparing of the signals received on the downlink and identifying of successive RACH preamble failures. As such, improved performance uplink (UL) performance at a UE may be achieved.

30 Claims, 9 Drawing Sheets

(51) Int. Cl.
    *H04W 36/16*     (2009.01)
    *H04W 36/30*     (2009.01)
    *H04W 52/36*     (2009.01)
    *H04W 76/02*     (2009.01)

(56) References Cited

U.S. PATENT DOCUMENTS

| | | | |
|---|---|---|---|
| 8,427,971 | B2 | 4/2013 | Fischer et al. |
| 2009/0042582 | A1 | 2/2009 | Wang et al. |
| 2009/0247211 | A1 | 10/2009 | Kuroda |
| 2010/0041428 | A1* | 2/2010 | Chen et al. ............... 455/522 |
| 2010/0172299 | A1* | 7/2010 | Fischer et al. ............ 370/328 |
| 2013/0005272 | A1* | 1/2013 | Shah et al. ............... 455/67.11 |
| 2013/0095879 | A1* | 4/2013 | Gupta et al. ............. 455/525 |
| 2013/0170416 | A1* | 7/2013 | Gopalan et al. .......... 370/311 |
| 2013/0242898 | A1* | 9/2013 | Johansson et al. ....... 370/329 |
| 2014/0099941 | A1* | 4/2014 | Ji .................... H04W 48/12 455/423 |
| 2014/0295851 | A1* | 10/2014 | Kubota et al. ........... 455/441 |

OTHER PUBLICATIONS

NTT Docomo, Inc., "Handlign of the Current Cell When the UE Failed in RRC Connection Establishment", Feb. 2013, 3GPP TSG-RAN2 Meeting #81, R2-130440, 4 Pages.*
International Search Report and Written Opinion—PCT/US2014/049060—ISA/EPO—Oct. 14, 2014. (10 total pages).
Yang Yang et al., "Analysis of Power Ramping Schemes for UTRA-FDD random Access Channel", IEEE Transactions on Wireless Communications, Nov. 2005, vol. 4, No. 6, pp. 2688-2693.
Wonbo Lee et al., "Self-Optimization of RACH Power Considering Multi-Cell Outage in 3GPP LTE Systems", IEEE, 2012, 5 pages.

* cited by examiner

METHOD AND APPARATUS FOR IMPROVING UPLINK PERFORMANCE AT A USER EQUIPMENT

CLAIM OF PRIORITY UNDER 35 U.S.C. §119

The present application for patent claims priority to U.S. Provisional Patent Application No. 61/872,326, filed Aug. 30, 2013, entitled "Method and Apparatus for Improving Performance of Random Access Channel (RACH) Preambles," which is assigned to the assignee hereof, and hereby expressly incorporated by reference herein.

BACKGROUND

Aspects of the present disclosure relate generally to wireless communication systems, and more particularly, to random access channel (RACH).

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

A user equipment (UE) camps on a cell using a cell selection or cell reselection procedure. However, the UE may camp on the cell without being in close physical proximity. In such cases, the UE can receive DL signaling messages, for example, system information block (SIB) messages from the cell, but the uplink transmitted messages, for example messages transmitted on the random access channel (RACH) may not reach the cell the UE is camped. The UE may try to communicate with the cell until the cell reselection criteria is satisfied.

In the above scenario, if the UE tries to transmit the radio resource control (RRC) connection request, timer T300 will expire without any success resulting in a degraded user experience. However, for a UE in such areas, the effect of the issue may be temporary because the UE can move out to other areas served by other cells. But for a user with low mobility, for example, vending machines, smart meters, etc., the effect on the performance is high as the low mobility user may have less opportunity to select another cell.

Therefore, there is a desire for a method and apparatus for improving uplink performance at a user equipment.

SUMMARY

The following presents a simplified summary of one or more aspects in order to provide a basic understanding of such aspects. This summary is not an extensive overview of all contemplated aspects, and is intended to neither identify key or critical elements of all aspects not delineate the scope of any or all aspects. Its sole purpose is to present some concepts of one or more aspects in a simplified form as a prelude to the more detailed description that is presented later.

The present disclosure presents example method and apparatus for improving uplink (UL) performance at a user equipment (UE). For example, in an aspect, the present disclosure presents an example method that may include identifying a random access channel (RACH) preamble failure when the UE is communicating with a current serving cell of the UE, increasing transmission power of successive RACH preambles based at least on the identifying, comparing signals received on a downlink at the UE via a first path and a second path from the current serving cell of the UE, and determining that a RACH preamble failure problem exists at the UE based at least on the comparing of the signals received on the downlink and successive RACH preamble failures.

Additionally, the present disclosure presents an example apparatus for improving uplink (UL) performance at a user equipment (UE) that may include means for identifying a random access channel (RACH) preamble failure when the UE is communicating with a current serving cell of the UE, means for increasing transmission power of successive RACH preambles based at least on the identifying, means for comparing signals received on a downlink at the UE via a first path and a second path from the current serving cell of the UE, and means for determining that a RACH preamble failure problem exists at the UE based at least on the comparing of the signals received on the downlink and successive RACH preamble failures.

In a further aspect, the present disclosure presents an example computer program product for improving uplink (UL) performance at a user equipment (UE) comprising a computer-readable medium comprising code for identifying a random access channel (RACH) preamble failure when the UE is communicating with a current serving cell of the UE, increasing transmission power of successive RACH preambles based at least on the identifying, comparing signals received on a downlink at the UE via a first path and a second path from the current serving cell of the UE, and determining that a RACH preamble failure problem exists at the UE based at least on the comparing of the signals received on the downlink and successive RACH preamble failures.

Furthermore, in an aspect, the present disclosure presents an example apparatus for improving uplink (UL) performance at a user equipment (UE) that may include random access channel (RACH) failure identifying component to identify a RACH preamble failure when the UE is communicating with a current serving cell of the UE, a transmission power component to increase transmission power of successive RACH preambles based at least on the identifying, a downlink signal comparing component to compare signals received on a downlink at the UE via a first path and a second path from the current serving cell of the UE, and a RACH access problem determining component to determine that a RACH preamble failure problem exists at the UE based at least on the comparing of the signals received on the downlink and successive RACH preamble failures.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure provides a method and apparatus for improving uplink (UL) performance at a user equipment (UE) that comprises identifying a random access channel (RACH) preamble failure when the UE is communicating with a current serving cell of the UE, increasing transmission power of successive RACH preambles based at least on the identifying, comparing signals received on a downlink at the UE via a first path and a second path from the current serving cell of the UE, and determining that a RACH preamble failure problem exists at the UE based at least on the comparing of the signals received on the downlink and identifying of successive RACH preamble failures.

Figure 1:
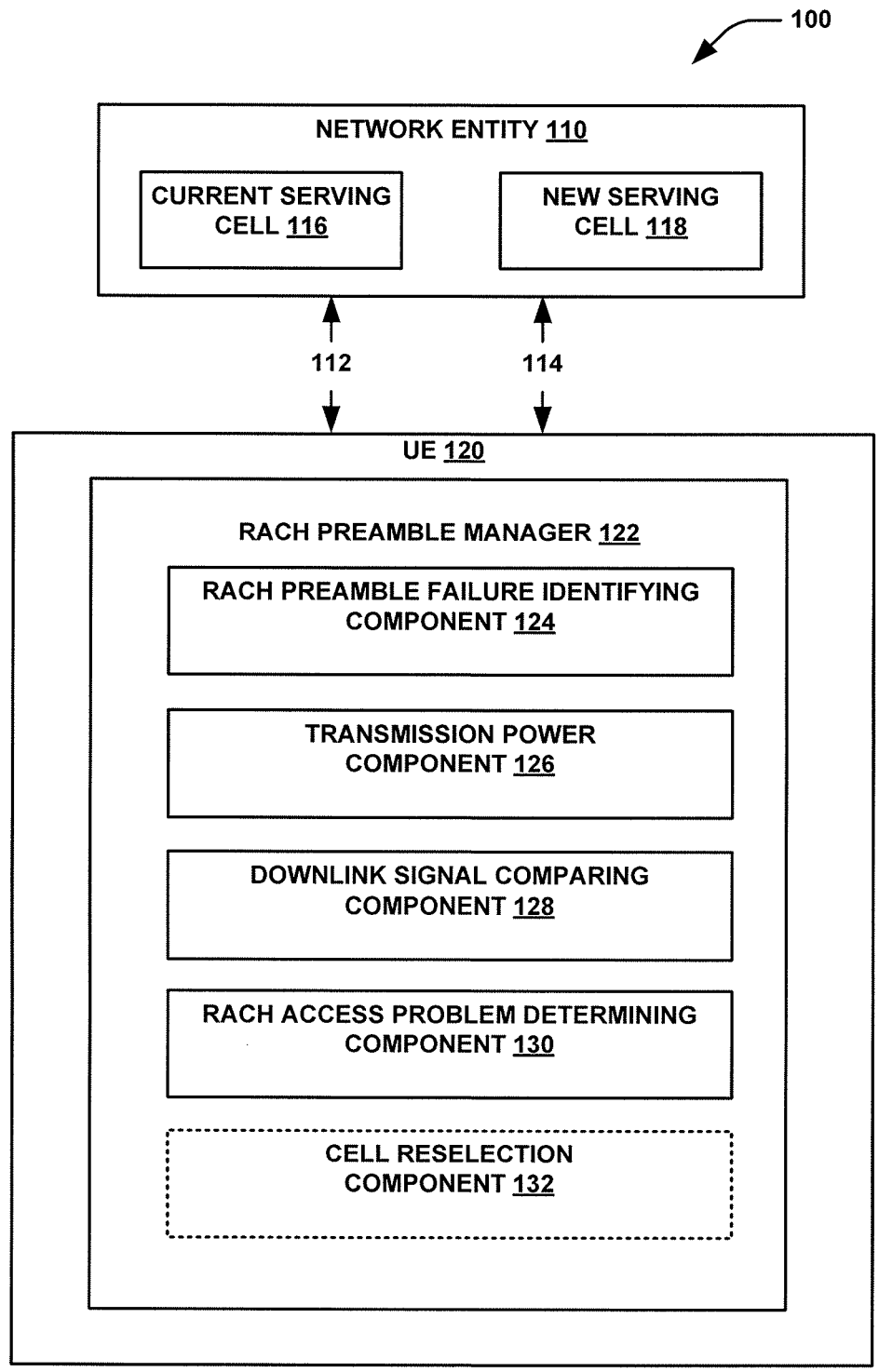
FIG. 1 is a block diagram illustrating an example wireless system of aspects of the present disclosure.

Referring to FIG. 1, a wireless communication system 100 is illustrated that facilitates improving uplink (UL) performance at a user equipment (UE). System 100 includes a user equipment (UE) 120 that may communicate with a network entity 110, via one or more over-the-air links 112 and/or 114, respectively. In an aspect, for example, network entity may be a Wideband Code Division Multiple Access (W-CDMA), a Global System for Mobile Communications (GSM) or a long term evolution (LTE) radio access technology (RAT) network. Additionally, network entity 102 may include one or more of any type of network components, for example, an access point, a base station (BS) or Node B or eNodeB, a macro cell, a femtocell, a pico cell, a relay, a peer-to-peer device, an authentication, authorization and accounting (AAA) server, a mobile switching center (MSC), etc., that can enable UE 120 to communicate and/or establish and/or maintain links 112, 114 to communicate with network entity 110.

The RACH procedure may be performed at UE 120, for example, as described in 3GPP Specifications. A RACH is an uplink transport channel, and is received from an entire cell. A RACH preamble is generally 4096 chips in length and may include 256 repetitions of a signature which is 16 chips in length. However, for example, a positive or a negative acknowledgement (e.g., acquisition indicator channel (AICH) indication) for a RACH preamble transmitted from UE 120 to network entity 110 may not be received at the UE for multiple reasons. For example, network entity 110 may have received a RACH preamble from UE 120, but network entity 110 may have failed to send a positive or a negative AICH to UE 120. This may be related to network design and/or network configuration issues. Additionally, the failure by network entity 120 to respond with an AICH NAK may result in increased interference as the UE may continue to transmit RACH preambles (e.g., in quick succession) to network entity 110. In an aspect, for example, the additional RACH preambles that are transmitted to network entity 110 in quick succession may result in increased interference at network entity 110 and/or other UEs.

In another example, network entity 110 may not have received RACH preambles transmitted from UE 120. This may be due to insufficient RACH preamble power for a given configuration and may also occur even after the UE transmits at a maximum allowed/capable transmission power. In an aspect, UE 120 may be configured to include a RACH preamble manager 122 that may be configured to improve uplink performance at UE 120 by identifying a RACH preamble failure when the UE is communicating with a current serving cell of the UE, increasing transmission power of successive RACH preambles, comparing signals received on a downlink at the UE via a first path and a second path from the current serving cell of the UE, and determining that a RACH preamble failure problem exists at the UE based at least on the comparing of the signals received on the downlink and identifying of successive RACH preamble failures.

In an example aspect, UE 120 and/or RACH preamble manager 122 may be configured to include a RACH preamble failure identifying component 124, a transmission power component 126, a downlink (DL) signal comparing component 128, a RACH access problem determining component 130 and/or an optional cell reselection component 132.

In an aspect, RACH preamble failure identifying component 124 may be configured to identify a RACH preamble failure when the UE is communicating with a serving cell. For example, in an aspect, when UE 120 is camped on current serving cell 116 and in communication with current serving cell 116, UE 120 may transmit a RACH preamble to current serving cell 116. However, current serving cell 116 may not receive the RACH preamble transmitted from UE 120 due to various reasons as described above. For example, in an aspect, in addition to the example scenarios described above, a RACH preamble failure may occur because UE 120 may have camped on a cell (e.g., current serving cell 116) that is a long way off from UE 120, which may result in a poor signal quality on the uplink but with good signal quality on the downlink. Although, the downlink communication between UE 120 and current serving cell 116 may be good (e.g., met serving cell selection criteria), the uplink communication may not be good enough, resulting in RACH preamble failures between UE 120 and current serving cell 116.

In an aspect, transmission power component 126 may be configured to increase transmission power of successive RACH preambles. For example, in an aspect, once RACH preamble failure identifying component 124 identifies that RACH preamble failure has occurred when UE 120 tried to communicate with current serving cell 116, transmission power component 126 may be configured to increase the transmission power with which UE 120 transmits RACH preambles to current serving cell 116. This may improve the chances to transmit a RACH preamble with success to current serving cell 116. In an additional or optional aspect, the transmission power of a RACH preamble may be increased in a fixed step relative to the transmitted power of an earlier RACH preamble.

In a further additional or optional aspect, the transmission power of RACH preamble may be increased to the maximum allowable transmission power as increasing the transmission power above the maximum allowable transmission power may affect performance of neighboring UEs and/or the current serving cell and/or neighboring cells. In a further additional aspect, the maximum allowable transmission power may be dependent on the UE capabilities.

In an aspect, downlink signaling comparing component 128 may be configured to compare signals received on a downlink at the UE. For example, in an aspect, UE 120 may receive signals via multiple paths, e.g., a first path and a second path, from current serving cell 116. For example, the first path may be via a direct signal received from current serving cell 116 and/or the second path may be via a signal received indirectly (e.g., after reflection by a water surface or any other surface) from the serving cell. Although the above description includes receiving of signals from the current serving cell over two paths, the UE may receive signals from the current serving cell via more than two paths, as the above description is for example purposes only, not as a limitation.

For example, in an aspect, downlink signaling comparing component 128 may compare signals received on the downlink from current serving cell 116 and determine that that the signals received from the current serving cell may be similar in strength. In an additional or optional aspect, downlink signaling comparing component 128 may be further configured to identify that the signals received via multiple paths on the downlink from the current serving cell are similar in strength if the difference between signal strengths is within a per-determined and/or pre-configured threshold value.

In an aspect, RACH access problem determining component 130 may be configured to determine that a RACH preamble failure problem exists at the UE based at least on the comparing of the signals received on the downlink and identifying of successive RACH preamble failures. For example, in an aspect, RACH access problem determining component 130 may be configured to determine that a RACH access problem exists when RACH access problem determining component 130 determines that downlink signaling comparing component 128 compared the signals received at UE 120 (from the current serving cell 116) via multiple paths are of similar strengths and RACH preamble failure identifying component 124 identified successive RACH preamble failures.

In an additional aspect, the existence of a RACH access problem may be determined when the number of successive RACH preamble failure is at/above a pre-determined number of successive RACH preamble failures. In a further optional aspect, existence of a RACH access problem may be determined based on a pre-determined number of consecutive RACH preamble failures within a pre-determined amount of time.

In an additional or optional aspect, the number of successive RACH preamble failures may be counted once the transmission power of the RACH preamble is at the maximum allowable transmission power. This may address RACH failures due to low transmission power and/or interference issues.

In an additional aspect, RACH preamble manager 122 may be configured to optionally include a cell reselection component 132. Cell reselection component 132 may be configured to trigger a reselection to a next best cell as a new serving cell of the UE based on cell reselection criteria. For example, in an aspect, cell reselection component 132 may be configured to trigger a cell reselection to new serving cell 118 when RACH access problem determining component 130 determines that a RACH preamble failure problem exists.

In an additional or optional aspect, cell reselection component 132 may be configured to select a second best cell (e.g., new serving cell 118) based on cell reselection criteria, instead of the first best cell (e.g., current serving cell 116) to address the RACH preamble failure issue. In an additional or optional aspect, cell reselection component 132 may be further configured to avoid selecting the first best cell as the current serving cell for a fixed amount of time to avoid going back and forth between cells.

In an additional aspect, if RACH access problem determining component 130 determines that the second best cell was identified earlier as having a RACH preamble failure problem, UE 120 may be configured to select the next best cell, and so on. In an optional aspect, the cells with RACH preamble failure problem for UE 120 may be stored in a database (not shown) along with the time the problem was identified.

Thus, as described above, improved uplink performance at a UE may be achieved.

Figure 2:
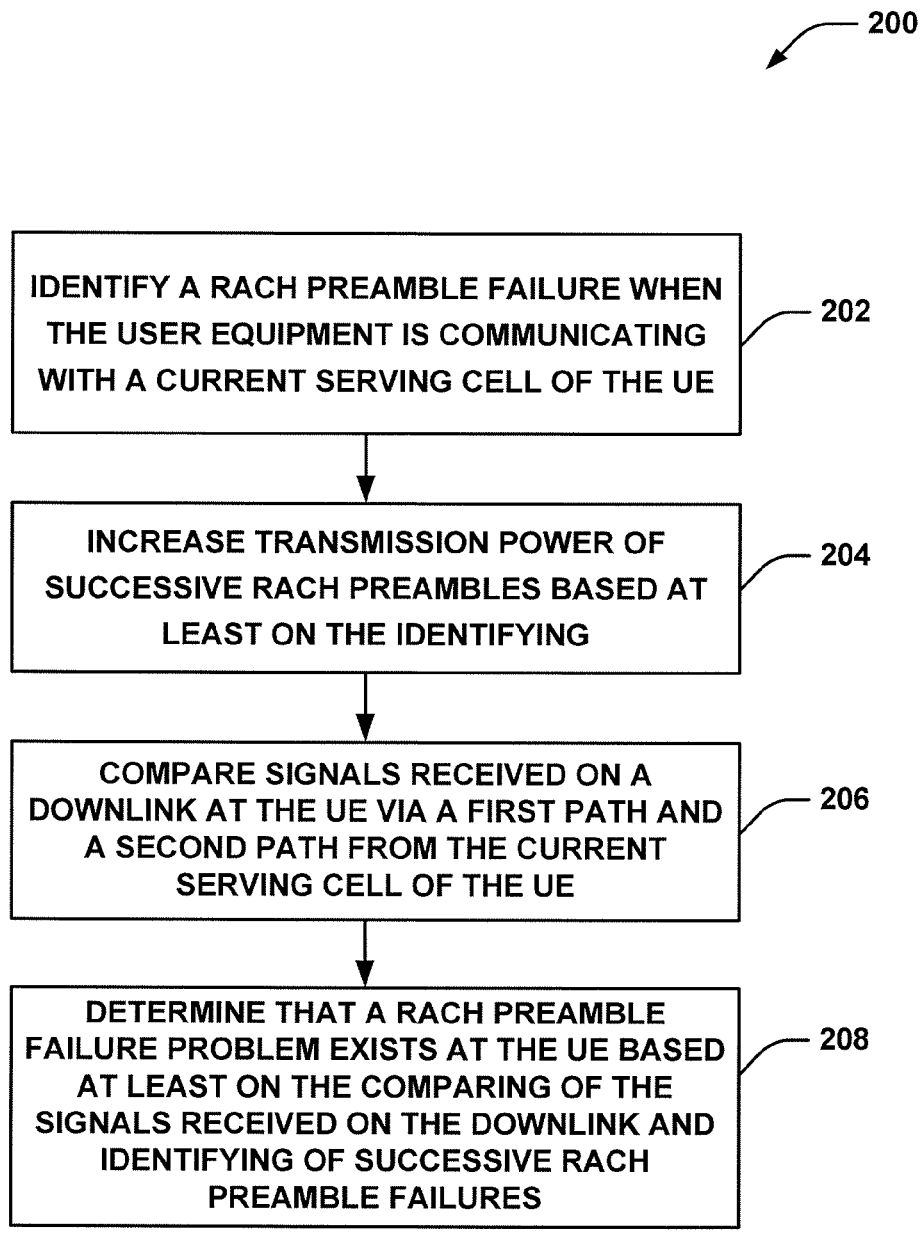
FIG. 2 is a flow diagram illustrating aspects of a method for improving uplink performance at a user equipment according to aspects of the present disclosure.

FIG. 2 illustrates an example methodology 200 for improving uplink (UL) performance at a user equipment (UE). In an aspect, at block 202, methodology 200 may include identifying a RACH preamble failure when the UE is communicating with a current serving cell of the UE. For example, in an aspect, UE 120, RACH preamble manager 122, and/or RACH preamble failure identifying component 124 may identify that a RACH preamble failure has occurred when UE 120 tried to communicate with current serving cell 116.

Further, at block 204, methodology 200 may include increasing transmission power of successive RACH preambles based at least on the identifying. For example, in an aspect, UE 120, RACH preamble manager 122, and/or transmission power component 126 may increase transmission power of successive RACH preambles at UE 120 once a RACH preamble failure is identified at UE 120 by RACH preamble failure identifying component 124.

Furthermore, at block 206, methodology 200 may include comparing signals received on a downlink at the UE via a first path and a second path from the current serving cell of the UE. For example, in an aspect, UE 120, RACH preamble manager 122, and/or downlink signal comparing component 128 may compare signals received on a downlink at UE 120 via multiple paths (e.g., a first path and a second path) from the serving cell (e.g., current serving cell 116). In an additional aspect, downlink signal comparing component 128 may be configured to identify that the signals received on the downlink from current serving cell 116 via multiple paths are of similar strength.

Additionally, at block 208, methodology 200 may include determining that a RACH preamble failure problem exists at the UE based at least on the comparing of the signals received on the downlink and identifying of successive RACH preamble failures. For example, in an aspect, UE 120, RACH preamble manager 122, and/or RACH access problem determining component 130 may determine that a RACH preamble failure problem exists at UE 120 based at least on the comparing of the signals received on the downlink and identifying of successive RACH preamble failures. That is, for example, RACH access problem determining component 130 may determine the existence of a RACH access problem when the signals received on the downlink on the first path and the second path are of similar quality and UE 120 has seen successive (for example, five or ten, etc.) RACH preamble failures when UE 120 tried to communicate with current serving cell 116.

In an optional aspect, methodology 200 may include triggering a cell reselection to a next best cell, other than the current serving cell, as a new serving cell of the UE based on cell reselection criteria, wherein the triggering is based on the determining that a RACH preamble failure problem exists at the UE (e.g., after block 208). For example, in an optional aspect, UE 120, RACH preamble manager 122, and/or cell reselection component 132 may trigger a cell reselection to a next best cell (e.g., new serving cell 118), other than current serving cell, as the new serving cell of UE 120 based on cell reselection criteria when it is determined that a RACH preamble failure problem exists at UE 120.

Figure 3:
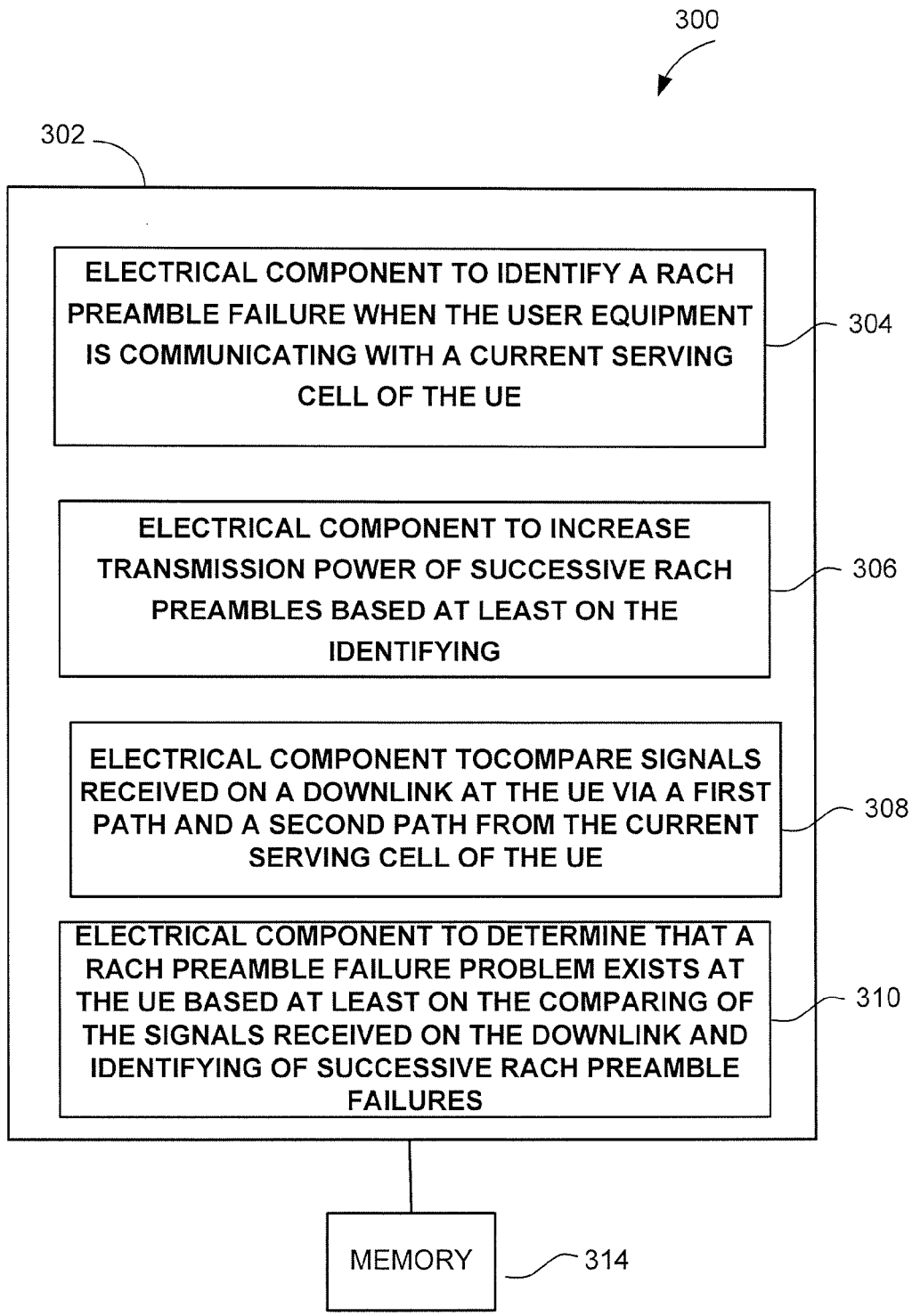
FIG. 3 is a block diagram illustrating aspects of a logical grouping of electrical components as contemplated by the present disclosure.

Referring to FIG. 3, an example system 300 is displayed for improving uplink performance at a user equipment. For example, system 300 can reside at least partially within UE 120 (FIG. 1). It is to be appreciated that system 300 is represented as including functional blocks, which can be functional blocks that represent functions implemented by a processor, software, or combination thereof (for example, firmware). System 300 includes a logical grouping 302 of electrical components that can act in conjunction. For instance, logical grouping 302 can include an electrical component 304 to identify a RACH preamble failure when the UE is communicating with a current serving cell of the UE. For example, in an aspect, for example, electrical component 304 may comprise RACH preamble failure identifying component 124 (FIG. 1).

Further, in an aspect, logical grouping 302 can include an electrical component 306 for increasing transmission power of successive RACH preambles based at least on the identifying. For example, in an aspect, for example, electrical component 306 may comprise transmission power component 126 (FIG. 1).

Furthermore, logical grouping 302 can include an electrical component 308 for comparing signals received on a downlink at the UE via a first path and a second path from the current serving cell of the UE. For example, in an aspect, electrical component 308 may comprise downlink signal comparing component 128 (FIG. 1).

Additionally, logical grouping 302 can include an electrical component 310 for determining that a RACH preamble failure problem exists at the UE based at least on the comparing of the signals received on the downlink and identifying of successive RACH preamble failures. For example, in an aspect, electrical component 310 may comprise RACH access problem determining component 130 (FIG. 1).

In an additional or optional aspect, logical grouping 302 may optionally include an electrical component (not shown) for triggering a cell reselection to a next best cell, wherein the triggering is based on the determining that a RACH preamble failure problem exists at the UE. For example, in an aspect, electrical component 312 (not shown) may comprise cell reselection component 132 (FIG. 1).

In an aspect, system 300 can include a memory 312 that retains instructions for executing functions associated with the electrical components 304, 306, 308, and/or 310, and stores data used or obtained by the electrical components 304, 306, 308, and/or 310, etc. While shown as being external to memory 312, it is to be understood that one or more of the electrical components 304, 306, 308, and/or 310 can exist within memory 312. In one example, electrical components 304, 306, 308, and/or 310 can comprise at least one processor, or each electrical component 304, 306, 308, and/or 310 can be a corresponding module of at least one processor. Moreover, in an additional or alternative example, electrical components 304, 306, 308, and/or 310 can be a computer program product including a computer readable medium, where each electrical component 304, 306, 308, and/or 310 can be corresponding code.

Figure 4:
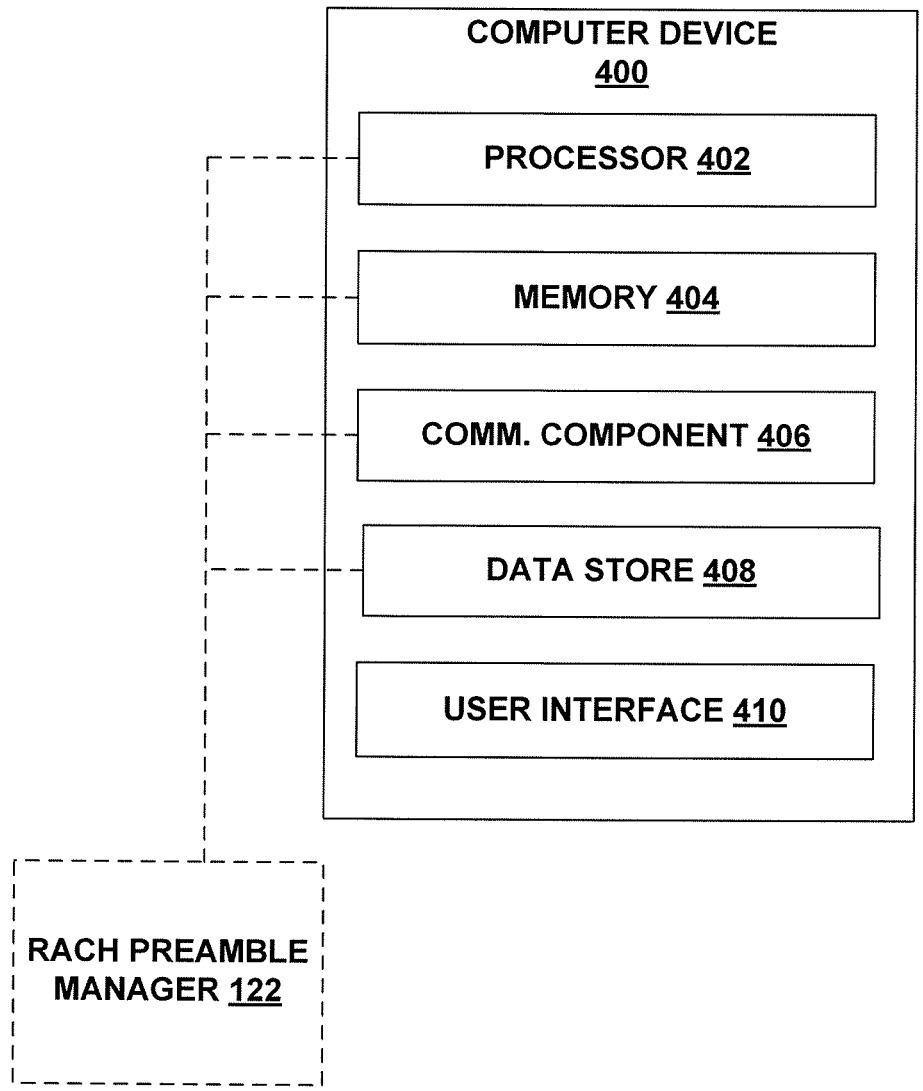
FIG. 4 is a block diagram illustrating aspects of a computer device according to the present disclosure.

Referring to FIG. 4, in an aspect, any of UE 120 including RACH preamble manager 122 and/or network entity 110 including current serving cell 116/new serving cell 118 (FIG. 1) may be represented by a specially programmed or configured computer device 400. In one aspect of UE implementation (for example, UE 120 of FIG. 1), computer device 400 may include RACH preamble manager 122 (FIG. 1), such as in specially programmed computer readable instructions or code, firmware, hardware, or some combination thereof. Computer device 400 includes a processor 402 for carrying out processing functions associated with one or more of components and functions described herein. Processor 402 can include a single or multiple set of processors or multi-core processors. Moreover, processor 402 can be implemented as an integrated processing system and/or a distributed processing system.

Computer device 400 further includes a memory 404, such as for storing data used herein and/or local versions of applications being executed by processor 402. Memory 404 can include any type of memory usable by a computer, such as random access memory (RAM), read only memory (ROM), tapes, magnetic discs, optical discs, volatile memory, non-volatile memory, and any combination thereof.

Further, computer device 400 includes a communications component 406 that provides for establishing and maintaining communications with one or more parties utilizing hardware, software, and services as described herein. Communications component 406 may carry communications between components on computer device 400, as well as between computer device 400 and external devices, such as devices located across a communications network and/or devices serially or locally connected to computer device 400. For example, communications component 406 may include one or more buses, and may further include transmit chain components and receive chain components associated with a transmitter and receiver, respectively, or a transceiver, operable for interfacing with external devices. In an additional aspect, communications component 406 may be configured to receive one or more pages from one or more subscriber networks. In a further aspect, such a page may correspond to the second subscription and may be received via the first technology type communication services.

Additionally, computer device 400 may further include a data store 408, which can be any suitable combination of hardware and/or software, that provides for mass storage of information, databases, and programs employed in connection with aspects described herein. For example, data store 408 may be a data repository for applications not currently being executed by processor 402 and/or any threshold values or finger position values.

Computer device 400 may additionally include a user interface component 410 operable to receive inputs from a user of computer device 400 and further operable to generate outputs for presentation to the user. User interface component 410 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 410 may include one or more output devices, including but not limited to a display, a speaker, a haptic feedback mechanism, a printer, any other mechanism capable of presenting an output to a user, or any combination thereof.

Figure 5:
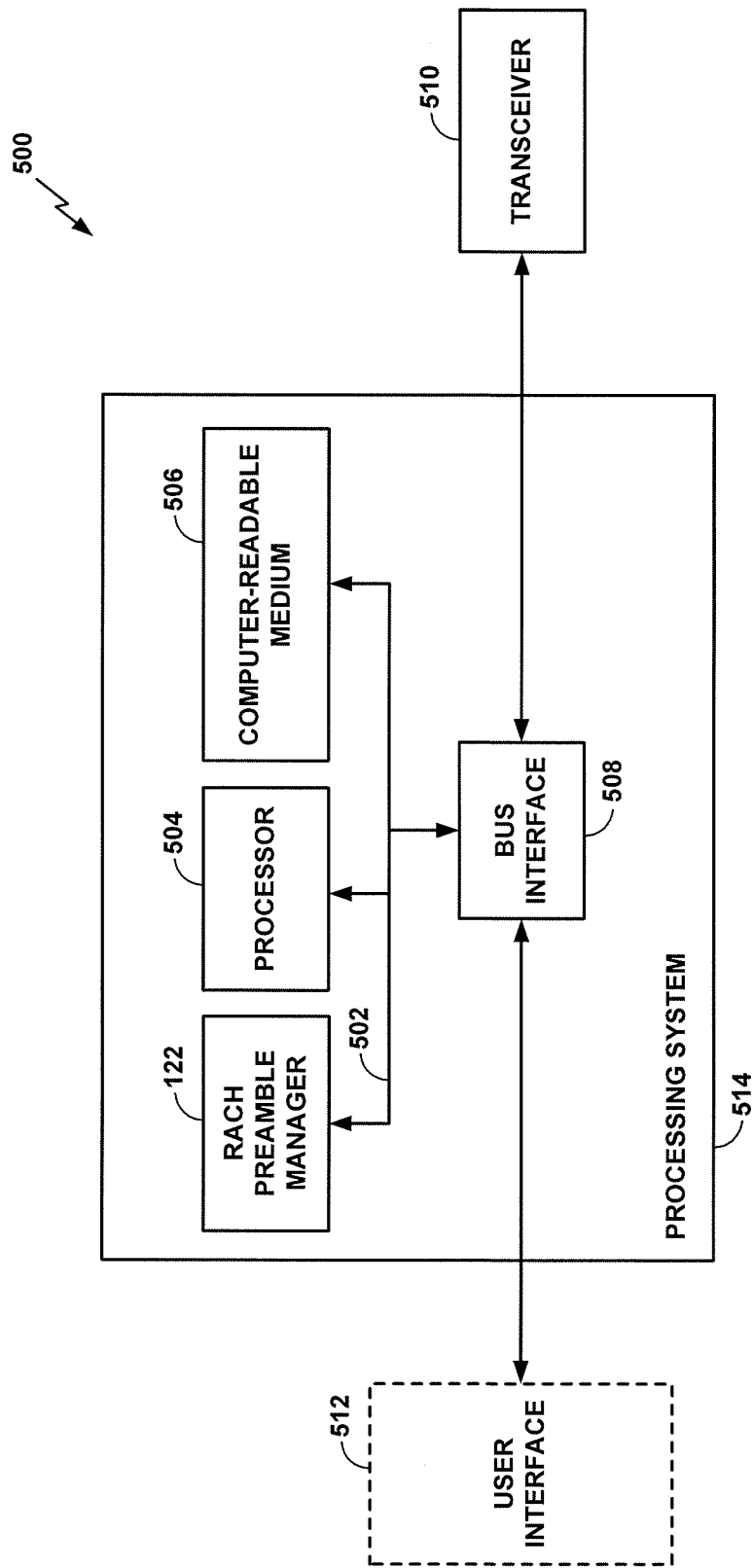
FIG. 5 is a block diagram illustrating an example of a hardware implementation for an apparatus employing a processing system.

FIG. 5 is a block diagram illustrating an example of a hardware implementation for an apparatus 500, for example, including RACH preamble manager 122 of FIG. 1, employing a processing system 514 for carrying out aspects of the present disclosure, such as methods for optimized processing of information blocks during cell reselection. In this example, the processing system 514 may be implemented with a bus architecture, represented generally by a bus 502. The bus 502 may include any number of interconnecting buses and bridges depending on the specific application of the processing system 514 and the overall design constraints. The bus 502 links together various circuits including one or more processors, represented generally by the processor 504, computer-readable media, represented generally by the computer-readable medium 505, and one or more components described herein, such as, but not limited to, RACH preamble manager 122 (FIG. 1). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a means for communicating with various other apparatus over a transmission medium. Depending upon the nature of the apparatus, a user interface 512 (e.g., keypad, display, speaker, microphone, joystick) may also be provided.

The processor 504 is responsible for managing the bus 502 and general processing, including the execution of software stored on the computer-readable medium 505. The software, when executed by the processor 504, causes the processing system 514 to perform the various functions described infra for any particular apparatus. The computer-readable medium 505 may also be used for storing data that is manipulated by the processor 504 when executing software.

Figure 6:
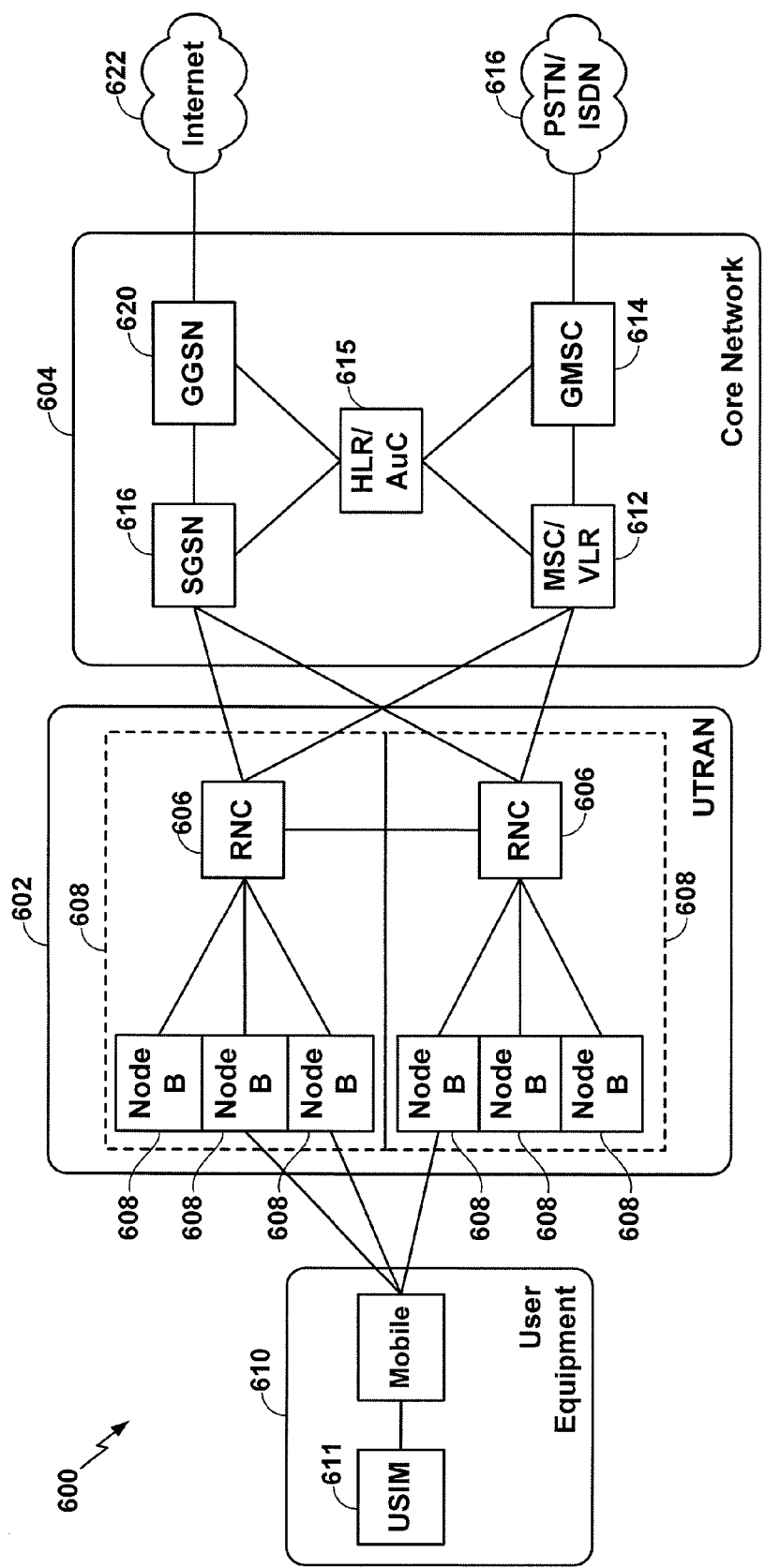
FIG. 6 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 6 are presented with reference to a UMTS system 600 employing a W-CDMA air interface, and may include a UE 120 executing an aspect of RACH preamble manager 122 of FIG. 1. A UMTS network includes three interacting domains: a Core Network (CN) 604, a UMTS Terrestrial Radio Access Network (UTRAN) 602, and UE 610. In an aspect, as noted, UE 610 may be UE 120 (FIG. 1) and may be configured to perform functions thereof, for example, including decoding one or more information blocks. Further, UTRAN 602 may comprise network entity 110 (FIG. 1), which in this case may be respective ones of the Node Bs 608. In this example, UTRAN 602 provides various wireless services including telephony, video, data, messaging, broadcasts, and/or other services. The UTRAN 602 may include a plurality of Radio Network Subsystems (RNSs) such as an RNS 606, each controlled by a respective Radio Network Controller (RNC) such as an RNC 606. Here, the UTRAN 602 may include any number of RNCs 606 and RNSs 606 in addition to the RNCs 606 and RNSs 606 illustrated herein. The RNC 606 is an apparatus responsible for, among other things, assigning, reconfiguring, and releasing radio resources within the RNS 606. The RNC 606 may be interconnected to other RNCs (not shown) in the UTRAN 602 through various types of interfaces such as a direct physical connection, a virtual network, or the like, using any suitable transport network.

Communication between UE 610 and Node B 608 may be considered as including a physical (PHY) layer and a medium access control (MAC) layer. Further, communication between UE 610 and RNC 606 by way of a respective Node B 608 may be considered as including a radio resource control (RRC) layer. In the instant specification, the PHY layer may be considered layer 1; the MAC layer may be considered layer 6; and the RRC layer may be considered layer 3. Information herein below utilizes terminology introduced in the RRC Protocol Specification, 3GPP TS 65.331 v6.1.0, incorporated herein by reference.

The geographic region covered by the RNS 606 may be divided into a number of cells, with a radio transceiver apparatus serving each cell. A radio transceiver apparatus is commonly referred to as a NodeB in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 608 are shown in each RNS 606; however, the RNSs 606 may include any number of wireless Node Bs. The Node Bs 608 provide wireless access points to a CN 604 for any number of mobile apparatuses, such as UE 120 or 610, and may be source current serving cell 116 and/or new serving cell 118 of FIG. 1. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus in this case is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

In a UMTS system, the UE 610 may further include a universal subscriber identity module (USIM) 611, which contains a user's subscription information to a network. For illustrative purposes, one UE 610 is shown in communication with a number of the Node Bs 608. The DL, also called the forward link, refers to the communication link from a NodeB 608 to a UE 610, and the UL, also called the reverse link, refers to the communication link from a UE 610 to a NodeB 608.

The CN 604 interfaces with one or more access networks, such as the UTRAN 602. As shown, the CN 604 is a GSM core network. However, as those skilled in the art will recognize, the various concepts presented throughout this disclosure may be implemented in a RAN, or other suitable access network, to provide UEs with access to types of CNs other than GSM networks.

The CN 604 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 604 supports circuit-switched services with a MSC 612 and a GMSC 614. In some applications, the GMSC 614 may be referred to as a media gateway (MGW). One or more RNCs, such as the RNC 606, may be connected to the MSC 612. The MSC 612 is an apparatus that controls call setup, call routing, and UE mobility functions. The MSC 612 also includes a VLR that contains subscriber-related information for the duration that a UE is in the coverage area of the MSC 612. The GMSC 614 provides a gateway through the MSC 612 for the UE to access a circuit-switched network 616. The GMSC 614 includes a home location register (HLR) 615 containing subscriber data, such as the data reflecting the details of the services to which a particular user has subscribed. The HLR is also associated with an authentication center (AuC) that contains subscriber-specific authentication data. When a call is received for a particular UE, the GMSC 614 queries the HLR 615 to determine the UE's location and forwards the call to the particular MSC serving that location.

The CN 604 also supports packet-data services with a serving GPRS support node (SGSN) 616 and a gateway GPRS support node (GGSN) 620. GPRS, which stands for General Packet Radio Service, is designed to provide packet-data services at speeds higher than those available with standard circuit-switched data services. The GGSN 620 provides a connection for the UTRAN 602 to a packet-based network 622. The packet-based network 622 may be the Internet, a private data network, or some other suitable packet-based network. The primary function of the GGSN 620 is to provide the UEs 610 with packet-based network connectivity. Data packets may be transferred between the GGSN 620 and the UEs 610 through the SGSN 616, which performs primarily the same functions in the packet-based domain as the MSC 612 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a NodeB 808 and a UE 810. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 610 provides feedback to Node B 608 over the HS-DPCCH to indicate whether it correctly decoded a packet on the downlink.

HS-DPCCH further includes feedback signaling from the UE 610 to assist the Node B 608 in taking the right decision in terms of modulation and coding scheme and precoding weight selection, this feedback signaling including the CQI and PCI.

HSPA Evolved or HSPA+ is an evolution of the HSPA standard that includes MIMO and 64-QAM, enabling increased throughput and higher performance. That is, in an aspect of the disclosure, the Node B 608 and/or the UE 610 may have multiple antennas supporting MIMO technology. The use of MIMO technology enables the Node B 608 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 810 to increase the data rate or to multiple UEs 810 to increase the overall system capacity. This is achieved by spatially precoding each data stream and then transmitting each spatially precoded stream through a different transmit antenna on the downlink. The spatially precoded data streams arrive at the UE(s) 810 with different spatial signatures, which enables each of the UE(s) 610 to recover the one or more the data streams destined for that UE 610. On the uplink, each UE 610 may transmit one or more spatially precoded data streams, which enables Node B 608 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 7:
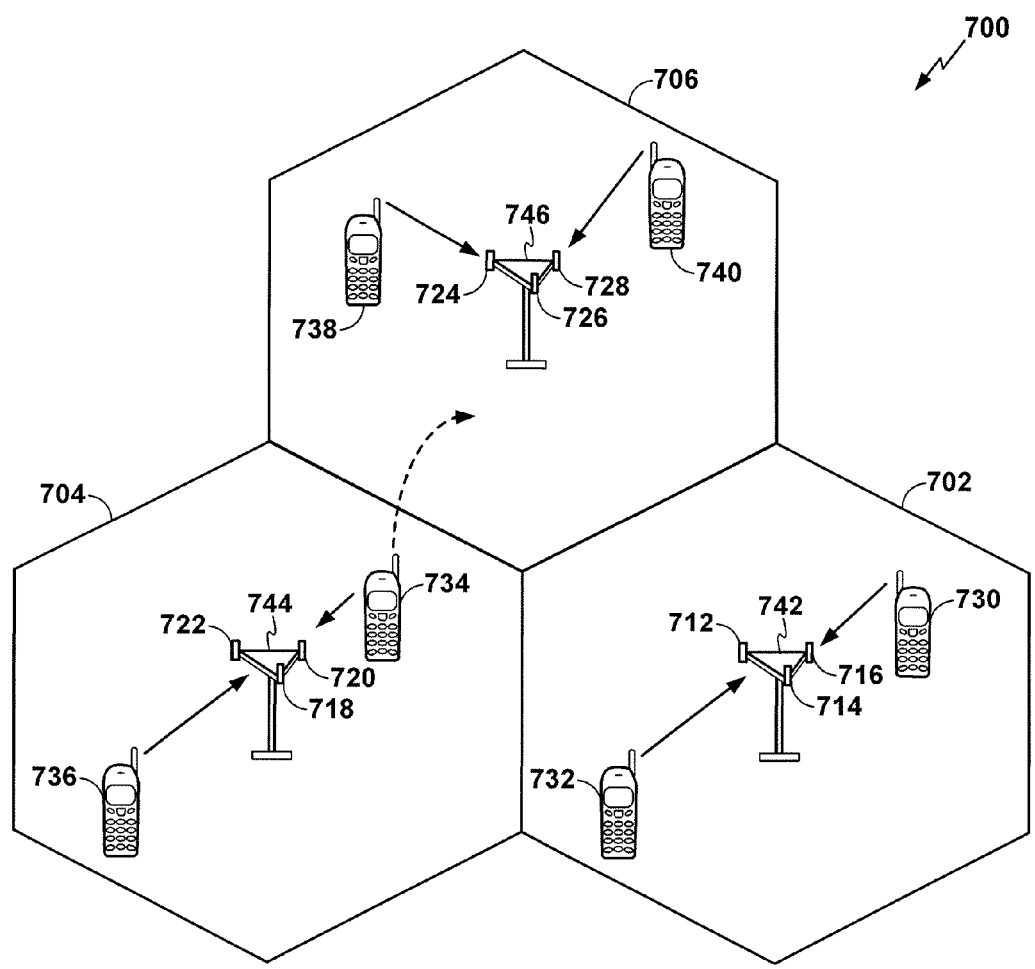
FIG. 7 is a conceptual diagram illustrating an example of an access network.

Referring to FIG. 7, an access network 700 in a UTRAN architecture is illustrated, and may include one or more UEs configured to include RACH preamble manager 120 (FIG. 1)

for improving uplink performance at a user equipment. The multiple access wireless communication system includes multiple cellular regions (cells), including cells 702, 704, and 706, each of which may include one or more sectors. The multiple sectors can be formed by groups of antennas with each antenna responsible for communication with UEs in a portion of the cell. For example, in cell 702, antenna groups 712, 714, and 716 may each correspond to a different sector. In cell 704, antenna groups 717, 720, and 722 each correspond to a different sector. In cell 706, antenna groups 724, 726, and 728 each correspond to a different sector. The cells 702, 704 and 706 may include several wireless communication devices, e.g., User Equipment or UEs, for example, including RACH preamble manager 122 of FIG. 1, which may be in communication with one or more sectors of each cell 702, 704 or 706. For example, UEs 730 and 732 may be in communication with NodeB 742, UEs 734 and 736 may be in communication with NodeB 744, and UEs 737 and 740 can be in communication with NodeB 746. Here, each NodeB 742, 744, 746 is configured to provide an access point for all the UEs 730, 732, 734, 736, 738, 740 in the respective cells 702, 704, and 706. Additionally, each NodeB 742, 744, 746 and UEs 730, 732, 734, 736, 738, 740 may be UE 120 of FIG. 1 and may perform the methods outlined herein.

As the UE 734 moves from the illustrated location in cell 704 into cell 706, a serving cell change (SCC) or handover may occur in which communication with the UE 734 transitions from the cell 704, which may be referred to as the source cell, to cell 706, which may be referred to as the target cell. Management of the handover procedure may take place at the UE 734, at the Node Bs corresponding to the respective cells, at a radio network controller 606 (FIG. 6), or at another suitable node in the wireless network. For example, during a call with the source cell 704, or at any other time, the UE 734 may monitor various parameters of the source cell 704 as well as various parameters of neighboring cells such as cells 706 and 702. Further, depending on the quality of these parameters, the UE 734 may maintain communication with one or more of the neighboring cells. During this time, the UE 734 may maintain an Active Set, that is, a list of cells that the UE 734 is simultaneously connected to (i.e., the UTRA cells that are currently assigning a downlink dedicated physical channel DPCH or fractional downlink dedicated physical channel F-DPCH to the UE 734 may constitute the Active Set). In any case, UE 734 may execute RACH preamble manager 122 to perform the operations described herein.

Further, the modulation and multiple access scheme employed by the access network 700 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 902.11 (Wi-Fi), IEEE 902.16 (WiMAX), IEEE 902.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 8:
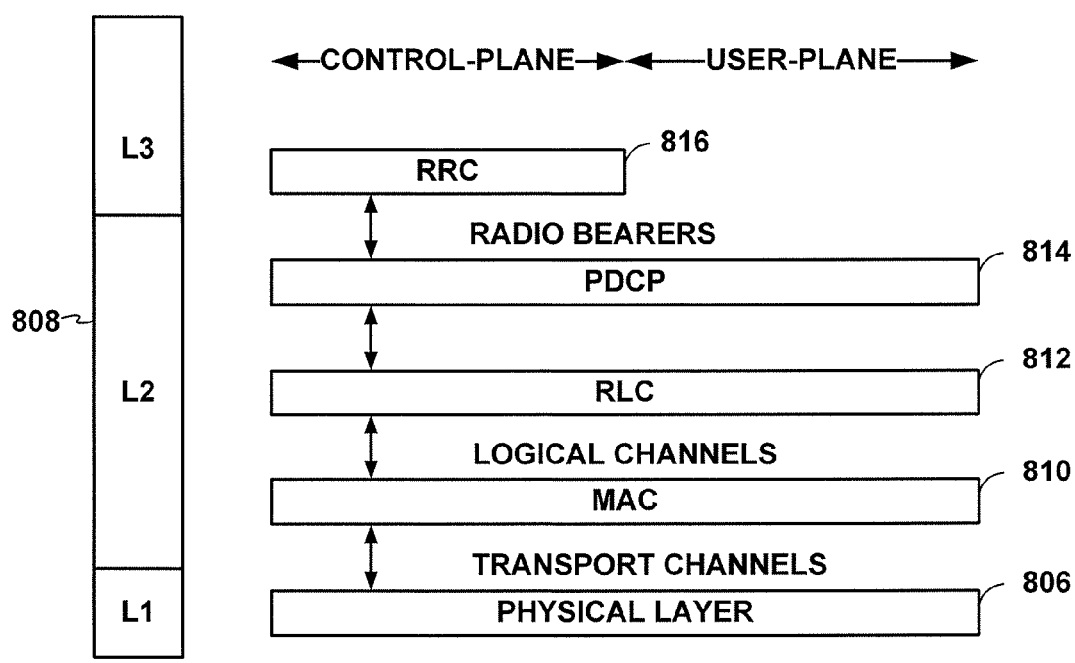
FIG. 8 is a conceptual diagram illustrating an example of a radio protocol architecture for the user and control plane.

The radio protocol architecture may take on various forms depending on the particular application. An example for an HSPA system will now be presented with reference to FIG. 8. FIG. 8 is a conceptual diagram illustrating an example of the radio protocol architecture for the user and control planes.

Turning to FIG. 8, the radio protocol architecture for the UE, for example, UE 120 of FIG. 1 configured to include RACH preamble manager 122 (FIG. 1) for improving uplink performance at a user equipment, and a Node B is shown with three layers: Layer 1, Layer 2, and Layer 3. Layer 1 is the lowest lower and implements various physical layer signal processing functions. Layer 1 will be referred to herein as the physical layer 806. Layer 2 (L2 layer) 808 is above the physical layer 806 and is responsible for the link between the UE and node B over the physical layer 806.

In the user plane, the L2 layer 808 includes a media access control (MAC) sublayer 810, a radio link control (RLC) sublayer 812, and a packet data convergence protocol (PDCP) 814 sublayer, which are terminated at the node B on the network side. Although not shown, the UE may have several upper layers above the L2 layer 808 including a network layer (e.g., IP layer) that is terminated at a PDN gateway on the network side, and an application layer that is terminated at the other end of the connection (e.g., far end UE, server, etc.).

The PDCP sublayer 814 provides multiplexing between different radio bearers and logical channels. The PDCP sublayer 814 also provides header compression for upper layer data packets to reduce radio transmission overhead, security by ciphering the data packets, and handover support for UEs between NodeBs. The RLC sublayer 812 provides segmentation and reassembly of upper layer data packets, retransmission of lost data packets, and reordering of data packets to compensate for out-of-order reception due to hybrid automatic repeat request (HARQ). The MAC sublayer 810 provides multiplexing between logical and transport channels. The MAC sublayer 810 is also responsible for allocating the various radio resources (e.g., resource blocks) in one cell among the UEs. The MAC sublayer 810 is also responsible for HARQ operations.

In the control plane, the radio protocol architecture for the UE and eNB is substantially the same for the physical layer 806 and the L2 layer 808 with the exception that there is no header compression function for the control plane. The control plane also includes a radio resource control (RRC) sublayer 816 in Layer 3 (L3 layer). The RRC sublayer 816 is responsible for obtaining radio resources (i.e., radio bearers) and for configuring the lower layers using RRC signaling between the eNB and the UE.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems.

The actual telecommunication standard, network architecture, and/or communication standard employed will depend on the specific application and the overall design constraints imposed on the system.

Figure 9:
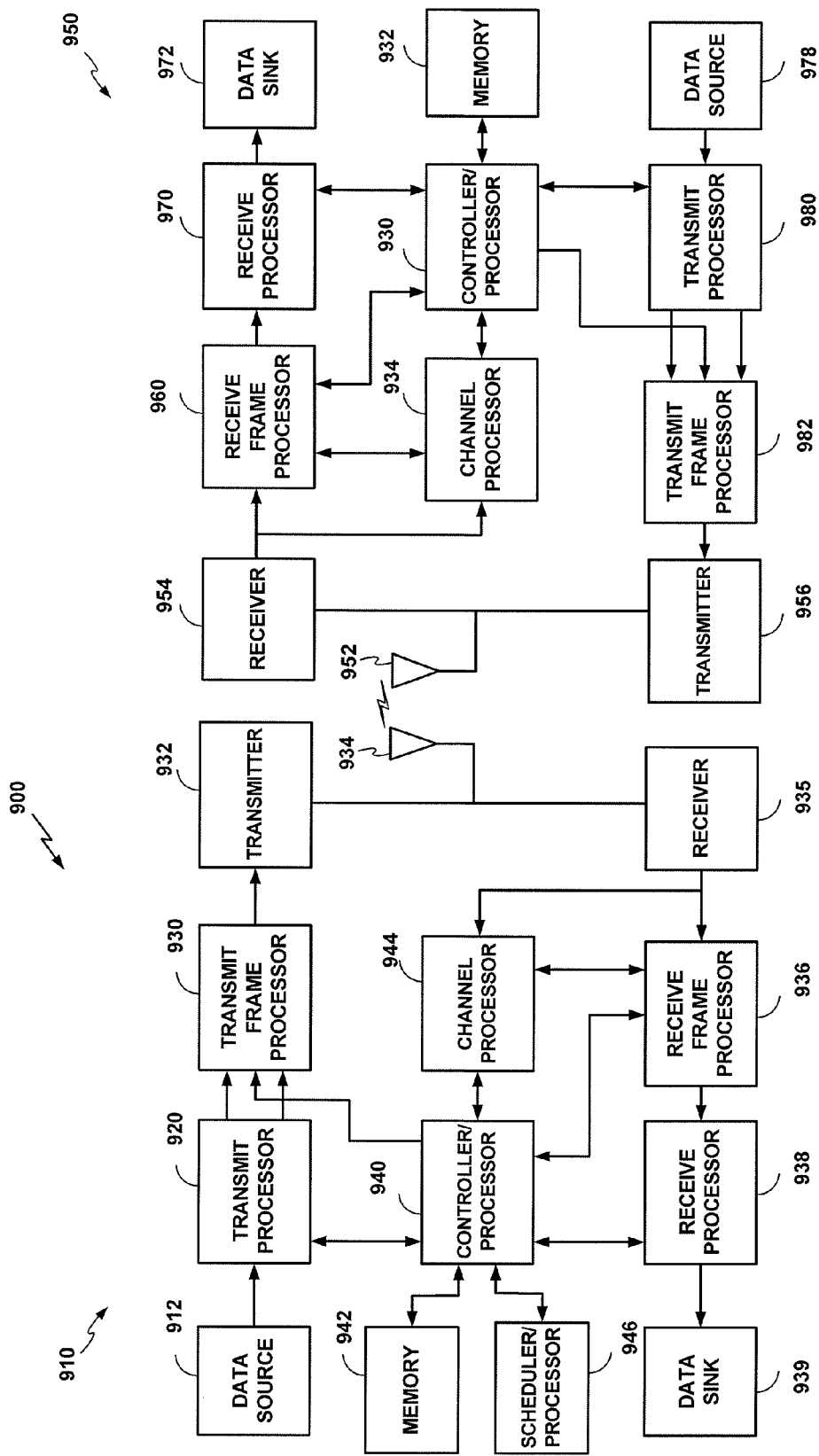
FIG. 9 is a block diagram conceptually illustrating an example of a NodeB in communication with a UE in a telecommunications system.

FIG. 9 is a block diagram of a NodeB 910 in communication with a UE 950, where the NodeB 910 may be the current serving cell 116 and/or new serving cell 118 (FIG. 1), and the UE 950 may be UE 120 of FIG. 1 configured to include RACH preamble manager 122 (FIG. 1). In the downlink communication, a transmit processor 920 may receive data from a data source 912 and control signals from a controller/processor 940. The transmit processor 920 provides various signal processing functions for the data and control signals, as well as reference signals (e.g., pilot signals). For example, the transmit processor 920 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 944 may be used by a controller/processor 940 to determine the coding, modulation, spreading, and/or scrambling schemes for the transmit processor 920. These channel estimates may be derived from a reference signal transmitted by the UE 950 or from feedback from the UE 950. The symbols generated by the transmit processor 920 are provided to a transmit frame processor 930 to create a frame structure. The transmit frame processor 930 creates this frame structure by multiplexing the symbols with information from the controller/processor 940, resulting in a series of frames. The frames are then provided to a transmitter 932, which provides various signal conditioning functions including amplifying, filtering, and modulating the frames onto a carrier for downlink transmission over the wireless medium through antenna 934. The antenna 934 may include one or more antennas, for example, including beam steering bidirectional adaptive antenna arrays or other similar beam technologies.

At the UE 950, a receiver 954 receives the downlink transmission through an antenna 952 and processes the transmission to recover the information modulated onto the carrier. The information recovered by the receiver 954 is provided to a receive frame processor 960, which parses each frame, and provides information from the frames to a channel processor 934 and the data, control, and reference signals to a receive processor 970. The receive processor 970 then performs the inverse of the processing performed by the transmit processor 920 in the NodeB 910. More specifically, the receive processor 970 descrambles and despreads the symbols, and then determines the most likely signal constellation points transmitted by the NodeB 910 based on the modulation scheme. These soft decisions may be based on channel estimates computed by the channel processor 934. The soft decisions are then decoded and deinterleaved to recover the data, control, and reference signals. The CRC codes are then checked to determine whether the frames were successfully decoded. The data carried by the successfully decoded frames will then be provided to a data sink 972, which represents applications running in the UE 950 and/or various user interfaces (e.g., display). Control signals carried by successfully decoded frames will be provided to a controller/processor 930. When frames are unsuccessfully decoded by the receiver processor 970, the controller/processor 930 may also use an acknowledgement (ACK) and/or negative acknowledgement (NACK) protocol to support retransmission requests for those frames.

In the uplink, data from a data source 978 and control signals from the controller/processor 930 are provided to a transmit processor 980. The data source 978 may represent applications running in the UE 950 and various user interfaces (e.g., keyboard). Similar to the functionality described in connection with the downlink transmission by the NodeB 910, the transmit processor 980 provides various signal processing functions including CRC codes, coding and interleaving to facilitate FEC, mapping to signal constellations, spreading with OVSFs, and scrambling to produce a series of symbols. Channel estimates, derived by the channel processor 934 from a reference signal transmitted by the NodeB 910 or from feedback contained in the midamble transmitted by the NodeB 910, may be used to select the appropriate coding, modulation, spreading, and/or scrambling schemes. The symbols produced by the transmit processor 980 will be provided to a transmit frame processor 982 to create a frame structure. The transmit frame processor 982 creates this frame structure by multiplexing the symbols with information from the controller/processor 930, resulting in a series of frames. The frames are then provided to a transmitter 956, which provides various signal conditioning functions including amplification, filtering, and modulating the frames onto a carrier for uplink transmission over the wireless medium through the antenna 952.

The uplink transmission is processed at the NodeB 910 in a manner similar to that described in connection with the receiver function at the UE 950. A receiver 935 receives the uplink transmission through the antenna 934 and processes the transmission to recover the information modulated onto the carrier. The information recovered by the receiver 935 is provided to a receive frame processor 936, which parses each frame, and provides information from the frames to the channel processor 944 and the data, control, and reference signals to a receive processor 938. The receive processor 938 performs the inverse of the processing performed by the transmit processor 980 in the UE 950. The data and control signals carried by the successfully decoded frames may then be provided to a data sink 939 and the controller/processor, respectively. If some of the frames were unsuccessfully decoded by the receive processor, the controller/processor 940 may also use an acknowledgement (ACK) and/or negative acknowledgement (NACK) protocol to support retransmission requests for those frames.

The controller/processors 940 and 930 may be used to direct the operation at the NodeB 910 and the UE 950, respectively. For example, the controller/processors 940 and 930 may provide various functions including timing, peripheral interfaces, voltage regulation, power management, and other control functions. The computer readable media of memories 942 and 932 may store data and software for the NodeB 910 and the UE 950, respectively. A scheduler/processor 946 at the NodeB 910 may be used to allocate resources to the UEs and schedule downlink and/or uplink transmissions for the UEs.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for improving uplink (UL) performance at a user equipment (UE), comprising:
    identifying failure of a random access channel (RACH) preamble when the UE is communicating with a current serving cell of the UE;
    increasing transmission power of successive RACH preambles in response to the identifying of the failure of the RACH preamble;
    identifying failure of the successive RACH preambles after increasing the transmission power of the successive RACH preambles;
    comparing signals received on a downlink at the UE via a first path and a second path from the current serving cell of the UE, wherein the comparing includes identifying that a difference between strength of the signals is within in a pre-defined range; and
    determining that a RACH preamble failure problem exists at the UE based at least on the comparing of the signals received on the downlink and the identifying of the failure of the successive RACH preambles.

2. The method of claim 1, further comprising:
    triggering a cell reselection to a next best cell, other than the current serving cell, as a new serving cell of the UE based on cell reselection criteria, wherein the triggering is based on the determining that the RACH preamble failure problem exists at the UE.

3. The method of claim 2, further comprising:
    avoiding selection of the current serving cell as a serving cell for a pre-defined amount of time.

4. The method of claim 1, wherein the comparing comprises:
    comparing signals associated with direct waves and reflected waves, wherein the direct waves are received at the UE directly from a transmitting antenna of the serving cell and reflected waves are received at the UE indirectly after a reflection.

5. The method of claim 4, wherein the reflected waves are received at the UE indirectly after a reflection by a water surface.

6. The method of claim 1, wherein increasing the transmission power of the successive RACH preambles comprises successively increasing up to a maximum allowable transmission power.

7. The method of claim 1, further comprising:
    determining that the RACH preamble failure problem exists at the UE when a number of successive RACH preamble failures is above a pre-defined threshold value.

8. The method of claim 1, wherein increasing the transmission power of successive RACH preambles comprises increasing in a fixed step.

9. The method of claim 1, wherein the RACH preamble failure problem exists when the UE can receive signaling messages on the downlink (DL) from the current serving cell but the messages transmitted on the uplink (UL) from the UE do not reach the current serving cell.

10. An apparatus for improving uplink (UL) performance at a user equipment (UE), comprising:
    means for identifying failure of a random access channel (RACH) preamble when the UE is communicating with a current serving cell of the UE;
    means for increasing transmission power of successive RACH preambles in response to the identifying of the failure of the RACH preamble;

means for identifying failure of the successive RACH preambles after increasing the transmission power of the successive RACH preambles;

means for comparing signals received on a downlink at the UE via a first path and a second path from the current serving cell of the UE, wherein the comparing includes identifying that a difference between strength of the signals is within in a pre-defined range; and means for determining that a RACH preamble failure problem exists at the UE based at least on the comparing of the signals received on the downlink and the identifying of the failure of the successive RACH preambles.

11. The apparatus of claim 10, further comprising:
means for triggering a cell reselection to a next best cell, other than the current serving cell, as a new serving cell of the UE based on cell reselection criteria, wherein the triggering is based on the determining that the RACH preamble failure problem exists at the UE.

12. The apparatus of claim 11, further comprising:
means for avoiding selection of the current serving cell as a serving cell for a pre-defined amount of time.

13. The apparatus of claim 10, wherein the means for comparing comprises:
means for comparing signals associated with direct waves and reflected waves, wherein the direct waves are received at the UE directly from a transmitting antenna of the serving cell and reflected waves are received at the UE indirectly after a reflection.

14. The apparatus of claim 10, wherein the means for increasing the transmission power of the RACH preamble includes means for successively increasing the transmission power up to a maximum allowable transmission power.

15. The apparatus of claim 10, further comprising:
means for determining that the RACH preamble failure problem exists at the UE when a number of successive RACH preamble failures is above a pre-defined threshold value.

16. The apparatus of claim 10, wherein the means for increasing the transmission power of the successive RACH preambles includes means for increasing the transmission power in a fixed step.

17. A non-transitory computer readable medium storing computer executable code for improving uplink (UL) performance at a user equipment (UE), comprising:
code for identifying failure of a random access channel (RACH) preamble when the UE is communicating with a current serving cell of the UE;

code for increasing transmission power of successive RACH preambles in response to the identifying of the failure of the RACH preamble;

code for identifying failure of the successive RACH preambles after increasing the transmission power of the successive RACH preambles;

code for comparing signals received on a downlink at the UE via a first path and a second path from the current serving cell of the UE, wherein the comparing includes identifying that a difference between strength of the signals is within in a pre-defined range; and code for determining that a RACH preamble failure problem exists at the UE based at least on the comparing of the signals received on the downlink and the identifying of the failure of the successive RACH preambles.

18. The computer readable medium of claim 17, further comprising:
code for triggering a cell reselection to a next best cell, other than the current serving cell, as a new serving cell of the UE based on cell reselection criteria, wherein the triggering is based on the determining that the RACH preamble failure problem exists at the UE.

19. The computer readable medium of claim 18, further comprising:
code for avoiding selection of the current serving cell as a serving cell for a pre-defined amount of time.

20. The computer readable medium of claim 17, wherein the code for comparing comprises:
code for comparing signals associated with direct waves and reflected waves, wherein the direct waves are received at the UE directly from a transmitting antenna of the serving cell and reflected waves are received at the UE indirectly after a reflection.

21. The computer readable medium of claim 17, wherein the code for increasing the transmission power of the successive RACH preambles comprises code for increasing up to a maximum allowable transmission power.

22. The computer readable medium of claim 17, further comprising:
code for determining that the RACH preamble failure problem exists at the UE when a number of successive RACH preamble failures is above a pre-defined threshold value.

23. The computer readable medium of claim 17, wherein the code for increasing the transmission power of the successive RACH preambles comprises code for increasing in a fixed step.

24. An apparatus for improving uplink (UL) performance at a user equipment (UE), comprising:
a random access channel (RACH) failure identifying component to identify failure of a RACH preamble when the UE is communicating with a current serving cell of the UE;

a transmission power component to increase transmission power of successive RACH preambles in response to the identifying of the failure of the RACH preamble;

the RACH failure identifying component further configured to identify failure of the successive RACH preambles after increasing the transmission power of the successive RACH preambles;

a downlink signal comparing component to compare signals received on a downlink at the UE via a first path and a second path from the current serving cell of the UE, wherein the comparing includes identifying that a difference between strength of the signals is within in a pre-defined range; and a RACH preamble failure determining component to determine that a RACH preamble failure problem exists at the UE based at least on the comparing of the signals received on the downlink and the identifying of the failure of the successive RACH preambles.

25. The apparatus of claim 24, further comprising:
a cell reselection component to trigger a cell reselection to a next best cell, other than the current serving cell, as a new serving cell of the UE based on cell reselection criteria, wherein the triggering is based on the determining that the RACH preamble failure problem exists at the UE.

26. The apparatus of claim 25, wherein the cell reselection component is further configured to avoid selection of the current serving cell as a serving cell for a pre-defined amount of time.

27. The apparatus of claim 24, wherein the downlink signal comparing component is further configured to compare signals associated with direct waves and reflected waves, wherein the direct waves are received at the UE directly from a transmitting antenna of the serving cell and reflected waves are received at the UE indirectly after a reflection.

28. The apparatus of claim 24, wherein the transmission power component is further configured to increase the transmission power of the successive RACH preambles up to a maximum allowable transmission power.

29. The apparatus of claim 24, wherein the RACH preamble failure problem determining component is further configured to determine that the RACH preamble failure problem exists at the UE when a number of successive RACH preamble failures is above a pre-defined threshold value.

30. The apparatus of claim 24, wherein the transmission power component is further configured to increase the transmission power of the successive RACH preambles in a fixed step.

* * * * *